Figure 1:
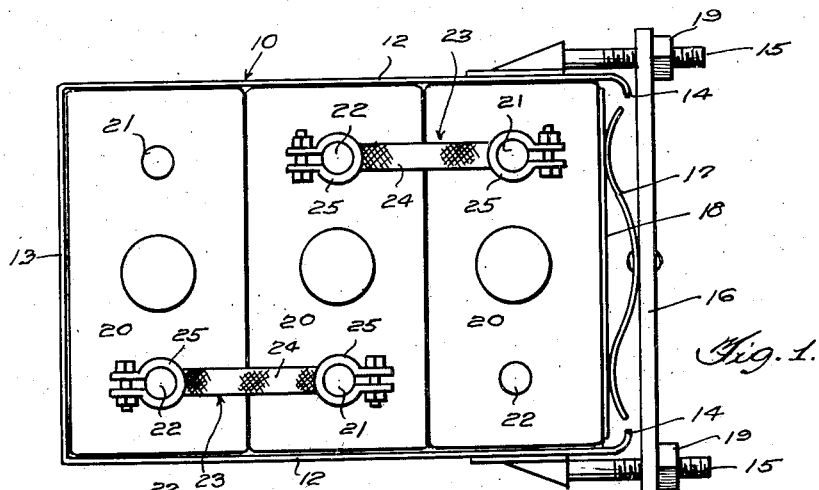

Feb. 15, 1949.  C. H. McCONNELL  2,461,752
STORAGE BATTERY HOLDER
Filed March 19, 1946

Inventor
Clifford H. McConnell,

By Clarence A. O'Brien
and Harvey B. Jacobson
Attorneys

Patented Feb. 15, 1949

2,461,752

UNITED STATES PATENT OFFICE 2,461,752

STORAGE BATTERY HOLDER

Clifford H. McConnell, Fort Peck, Mont.

Application March 19, 1946, Serial No. 655,496

1 Claim. (Cl. 136—171)

This invention relates to a storage battery and has for its primary object to facilitate the removal and replacement of a dead cell in a battery.

Another object is to enable a cell to be removed from a battery case without disturbing the other cells and to facilitate the connection of the new cell to the terminals of the cells.

The above and other objects may be attained by employing this invention which embodies among its features an open-ended case of non-conducting material, a group of separate and separable cells in said case, each cell having a positive and a negative terminal at its upper end, detachable connectors connecting the terminals of said cells in series and yielding means entering the open end of the case for engaging the end of an adjacent cell and holding said cells against one another in the case.

Other features include a follower in the case adapted to be engaged by a spring entering the case through the open end which yieldingly urges the follower against an adjacent cell to clamp the cells in the case, and inturned flanges at the open end of the case to retain the follower in the case when the pressure of the spring thereon is relieved.

Figure 2:
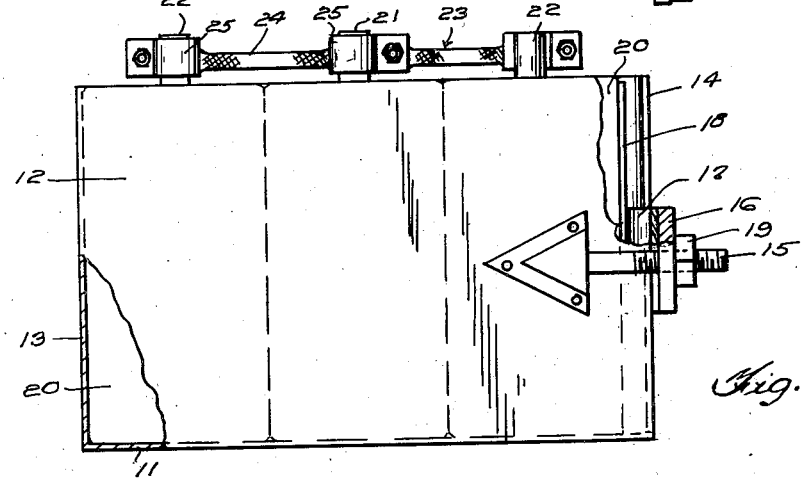
Figure 3:
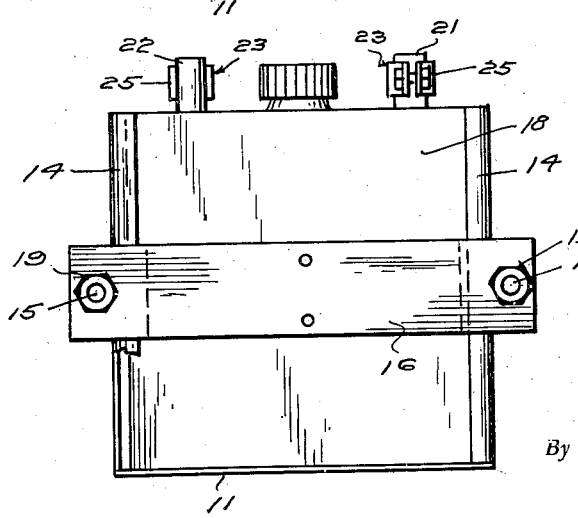

In the drawings,

Figure 1 is a plan view of a storage battery embodying the features of this invention, Figure 2 is a side view of Figure 1, certain portions of the case being broken away to more clearly illustrate the details of construction, and Figure 3 is an end view of the open end of the case, a portion of one of the follower retaining flanges being broken away to more clearly illustrate certain details of construction.

Referring to the drawings in detail, the battery case designated generally 10 comprises a box-like body of non-conducting material having a bottom wall 11, side walls 12 and one end wall 13. The side walls 12 at the open end of the case 10 are provided with inturned flanges 14 the purpose of which will more fully hereinafter appear. Fixed to the side walls 12 adjacent the open end of the case and extending longitudinally beyond the open end thereof are threaded studs 15 the purpose of which will more fully hereinafter appear.

Mounted for sliding movement on the studs 15 is a pressure bar 16 carrying on its inner face a bowed spring 17 the innermost bowed ends of which are adapted to engage a follower 18 which in the present instance constitutes a substantially rectangular plate of a size to freely slide longitudinally of the case adjacent its open end. Fitted on the studs 15 and bearing against the pressure bar 16 are nuts 19 by means of which the pressure of the spring 17 against the follower 18 may be governed.

Fitted within the case 10 is a group of separate and separable cells 20 each of which is provided at its upper end with a positive terminal 21 and a negative terminal 22. In the form illustrated the battery is composed of three separate cells 20 with the terminals of adjacent cells reversed for the convenient connection of the terminals in series by means of removable connectors designated generally 23. Each of these connectors comprises a conductor strap 24 preferably formed of braided copper wire and carrying at each end a clamp 25 which is adapted to be clamped about the terminals of the cells 20 as will be readily understood upon reference to the drawings.

In use it will be understood that the cells 20 are set in the case side by side as indicated in the drawings with the positive and negative terminals of the cells connected together in series by the connectors 23 and the follower plate 18 bearing against the end of the cell nearest the open end of the case. By adjusting the nuts 19 on the studs 15 it will be obvious that the pressure bar 16 will be moved along the studs to cause the spring 17 to bear against the follower with the desired pressure. In this way the cells 20 are clamped in operative position to produce a complete battery comprising a plurality of separate cells. Should it be necessary for any reason, as for instance one of the cells going dead, to replace the cell it is but a simple matter to release the pressure of the spring 17 against the follower 18 by turning the nuts 19 on the studs 15 and then disconnecting the connector 23 leading to the dead cell and lifting the cell out of the case. Obviously, a new cell may be introduced into the space formerly occupied by that cell which has been removed and by placing the terminals of the substituted cell in the proper position the connectors 23 may be attached thereto to form a complete power unit. The nuts 19 are again tightened on the studs 15 to produce the proper tension on the spring 17 and cause the follower plate 18 to cooperate with the end wall 13 of the case in clamping the cells in position.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A storage or secondary battery comprising an open-ended case of non-conducting material, a group of separate and separable cells in said case, each cell having a positive and a negative terminal at its upper end, detachable connectors connecting the terminals of said cells in series, a pair of screw threaded studs projecting longitudinally from the case on opposite sides of the open end thereof, a pressure bar slidably mounted on the studs, a spring on the pressure bar, a follower of non-conducting material in the case adapted to be engaged by the spring yieldingly to bear on the end of the cell adjacent the open end of the case and clamp the cells in the case, means threaded on the studs to regulate the pressure of the spring against the follower, and inturned flanges on the end edges of the side walls of the case at the open end thereof to retain the follower in the case when the pressure of the spring thereon is relieved.

CLIFFORD H. McCONNELL.

REFERENCES CITED

The following references are of record in the file of this patent:

UNITED STATES PATENTS

| Number | Name | Date |
|---|---|---|
| 505,392 | Coad | Sept. 19, 1893 |
| 1,568,927 | Stone et al. | Jan. 5, 1926 |
| 1,613,111 | Johnson | Jan. 4, 1927 |
| 1,978,779 | Barton | Oct. 30, 1934 |
| 2,009,199 | Pehotsky | July 23, 1935 |

FOREIGN PATENTS

| Number | Country | Date |
|---|---|---|
| 19,197 | Great Britain | 1914 |